(12) United States Patent
Sharma et al.

(10) Patent No.: US 8,165,136 B1
(45) Date of Patent: Apr. 24, 2012

(54) VIRTUAL PORT BASED SPAN

(75) Inventors: Samar Sharma, San Jose, CA (US);
Sanjaya Kumar, Fremont, CA (US);
Srinivas Avasarala, Sunnyvale, CA (US); Gaurav Rastogi, Mountain View, CA (US); Jeevan Kamisetty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1652 days.

(21) Appl. No.: 11/114,257

(22) Filed: Apr. 25, 2005

Related U.S. Application Data

(63) Continuation-in-part of application No. 10/655,452, filed on Sep. 3, 2003, now Pat. No. 7,474,666.

(51) Int. Cl.
*H04B 10/08* (2006.01)
*H04L 12/28* (2006.01)

(52) U.S. Cl. ........ 370/401; 370/235; 370/241; 370/392; 398/33; 398/177

(58) Field of Classification Search .......... 370/389, 370/392, 390, 409, 401, 235, 241; 398/33, 398/177
See application file for complete search history.

(56) References Cited

U.S. PATENT DOCUMENTS

| | | | |
|---|---|---|---|
| 5,481,735 A | 1/1996 | Mortensen et al. | |
| 5,515,376 A | 5/1996 | Murthy et al. | |
| 5,610,905 A | 3/1997 | Murthy et al. | |
| 5,790,554 A * | 8/1998 | Pitcher et al. | 370/471 |
| 5,920,705 A | 7/1999 | Lyon et al. | |
| 5,978,379 A * | 11/1999 | Chan et al. | 370/403 |
| 6,243,386 B1 * | 6/2001 | Chan et al. | 370/403 |
| 6,268,808 B1 | 7/2001 | Iryami et al. | |
| 6,272,180 B1 | 8/2001 | Lei | |
| 6,282,678 B1 | 8/2001 | Snay et al. | |
| 6,324,669 B1 | 11/2001 | Westby | |
| 6,377,571 B1 | 4/2002 | Tai | |
| 6,553,036 B1 * | 4/2003 | Miller et al. | 370/462 |
| 6,650,641 B1 | 11/2003 | Albert et al. | |
| 6,748,431 B1 * | 6/2004 | Fleig et al. | 709/224 |
| 6,886,102 B1 | 4/2005 | Lyle | |

(Continued)

FOREIGN PATENT DOCUMENTS
WO 0178308 10/2001

(Continued)

OTHER PUBLICATIONS

Performance virtualization for large-scale storage systems; Chambliss, D.D. et al.; Reliable Distributed Systems, 2003. Proceedings. 22nd International Symposium on Issue Date : Oct. 6-18, 2003.*

(Continued)

*Primary Examiner* — Phirin Sam
(74) *Attorney, Agent, or Firm* — Weaver Austin Villeneuve & Sampson LLP

(57) ABSTRACT

Methods and apparatus for performing SPAN for a virtual port are disclosed. Specifically, a frame is received from a first port. The frame or a copy thereof is transmitted to a second port, where the second port is identified in a header of the frame. At least one of the first port and the second port is a virtual port. The frame or a copy thereof is also transmitted to a third port, thereby enabling an analyzer coupled to the third port to analyze traffic received by the third port.

24 Claims, 6 Drawing Sheets

U.S. PATENT DOCUMENTS

| | | | |
|---|---|---|---|
| 6,888,800 B1* | 5/2005 | Johnson et al. | 370/247 |
| 6,892,287 B1 | 5/2005 | Millard et al. | |
| 6,904,061 B2 | 6/2005 | Schmitt et al. | |
| 6,954,437 B1* | 10/2005 | Sylvest et al. | 370/256 |
| 6,959,007 B1 | 10/2005 | Vogel et al. | |
| 7,007,208 B1 | 2/2006 | Hibbert et al. | |
| 7,020,715 B2 | 3/2006 | Venkataraman et al. | |
| 7,107,328 B1 | 9/2006 | Muthiyan et al. | |
| 7,124,198 B2 | 10/2006 | Pinkerton | |
| 7,155,494 B2* | 12/2006 | Czeiger et al. | 709/218 |
| 7,164,657 B2 | 1/2007 | Phaal | |
| 7,206,863 B1 | 4/2007 | Oliveira et al. | |
| 7,292,567 B2* | 11/2007 | Terrell et al. | 370/363 |
| 7,299,277 B1 | 11/2007 | Moran et al. | |
| 7,310,447 B2 | 12/2007 | Yano et al. | |
| 7,339,929 B2* | 3/2008 | Zelig et al. | 370/390 |
| 7,417,978 B1 | 8/2008 | Chou et al. | |
| 7,439,729 B2* | 10/2008 | Azimi et al. | 324/750.3 |
| 7,447,197 B2* | 11/2008 | Terrell et al. | 370/360 |
| 7,474,666 B2* | 1/2009 | Kloth et al. | 370/401 |
| 7,496,043 B1 | 2/2009 | Leong et al. | |
| 7,536,470 B2 | 5/2009 | Li et al. | |
| 7,706,316 B1* | 4/2010 | Kuik | 370/320 |
| 7,729,374 B2* | 6/2010 | Zettwoch | 370/466 |
| 7,782,784 B2 | 8/2010 | Agrawal et al. | |
| 7,836,332 B2* | 11/2010 | Hara et al. | 714/5.11 |
| 7,849,265 B2* | 12/2010 | Hara et al. | 711/114 |
| 2001/0055274 A1* | 12/2001 | Hegge et al. | 370/229 |
| 2002/0042866 A1 | 4/2002 | Grant et al. | |
| 2002/0046276 A1* | 4/2002 | Coffey et al. | 709/224 |
| 2002/0116564 A1 | 8/2002 | Paul et al. | |
| 2002/0136223 A1 | 9/2002 | Ho | |
| 2002/0143849 A1 | 10/2002 | Newell et al. | |
| 2002/0156924 A1 | 10/2002 | Czeiger et al. | |
| 2002/0186697 A1 | 12/2002 | Thakkar | |
| 2003/0026251 A1 | 2/2003 | Morris et al. | |
| 2003/0028634 A1 | 2/2003 | Oshizawa | |
| 2003/0040897 A1* | 2/2003 | Murphy et al. | 703/18 |
| 2003/0043755 A1 | 3/2003 | Mitchell | |
| 2003/0053464 A1 | 3/2003 | Chen et al. | |
| 2003/0076779 A1 | 4/2003 | Frank et al. | |
| 2003/0084319 A1* | 5/2003 | Tarquini et al. | 713/200 |
| 2003/0091037 A1 | 5/2003 | Latif et al. | |
| 2003/0118053 A1* | 6/2003 | Edsall et al. | 370/474 |
| 2003/0131105 A1* | 7/2003 | Czeiger et al. | 709/225 |
| 2003/0131182 A1* | 7/2003 | Kumar et al. | 711/5 |
| 2003/0137937 A1 | 7/2003 | Tsukishima et al. | |
| 2003/0152028 A1 | 8/2003 | Raisanen et al. | |
| 2003/0202536 A1 | 10/2003 | Foster et al. | |
| 2003/0214913 A1* | 11/2003 | Kan et al. | 370/252 |
| 2003/0227874 A1 | 12/2003 | Wang | |
| 2004/0034492 A1* | 2/2004 | Conway | 702/81 |
| 2004/0054758 A1 | 3/2004 | Chang et al. | |
| 2004/0085994 A1* | 5/2004 | Warren et al. | 370/462 |
| 2004/0086027 A1 | 5/2004 | Shattil | |
| 2004/0146063 A1 | 7/2004 | Goldshan et al. | |
| 2004/0151191 A1 | 8/2004 | Wu et al. | |
| 2004/0153863 A1 | 8/2004 | Klotz et al. | |
| 2005/0053073 A1* | 3/2005 | Kloth et al. | 370/395.41 |
| 2005/0114710 A1 | 5/2005 | Cornell et al. | |
| 2005/0232269 A1 | 10/2005 | Yao et al. | |
| 2005/0232285 A1* | 10/2005 | Terrell et al. | 370/401 |
| 2006/0010351 A1* | 1/2006 | Lee | 714/43 |
| 2006/0056455 A1 | 3/2006 | Ruiz | |
| 2006/0062254 A1 | 3/2006 | Markevitch et al. | |
| 2006/0168321 A1 | 7/2006 | Eisenberg et al. | |
| 2006/0274656 A1 | 12/2006 | Paul et al. | |
| 2006/0274755 A1 | 12/2006 | Brewer et al. | |
| 2007/0011318 A1* | 1/2007 | Roth | 709/224 |
| 2007/0028143 A1* | 2/2007 | Azimi et al. | 714/27 |
| 2007/0171914 A1 | 7/2007 | Kadambi et al. | |
| 2007/0208821 A1 | 9/2007 | Pittman | |
| 2007/0258457 A1 | 11/2007 | Sakamoto et al. | |
| 2008/0008202 A1 | 1/2008 | Terrell et al. | |
| 2009/0025007 A1* | 1/2009 | Hara et al. | 718/105 |
| 2009/0046593 A1 | 2/2009 | Ptasinski et al. | |
| 2009/0103566 A1 | 4/2009 | Kloth et al. | |
| 2009/0116381 A1* | 5/2009 | Kanda | 370/229 |
| 2009/0157984 A1* | 6/2009 | Hara et al. | 711/154 |
| 2011/0029973 A1* | 2/2011 | Hara et al. | 718/1 |
| 2011/0055477 A1* | 3/2011 | Hara et al. | 711/114 |

FOREIGN PATENT DOCUMENTS

| | | |
|---|---|---|
| WO | 02082728 | 10/2002 |

OTHER PUBLICATIONS

Fibre Channel Avionics Bus Monitoring, Feb. 27, 2001.*
Walker, David S., et al., U.S. Appl. No. 10/346,050, "Method and Apparatus for Remotely Monitoring Network Traffic Through a Generic Network", filed Jan. 15, 2003.
EP Examiner's Communication pursuant to Article 96(2) EPC dated Sep. 18, 2006, from related European Application No. 04781826.5, 11 pages.
Office Action dated Mar. 16, 2009 for U.S. Appl. No. 10/346,050. (Palermo).
U.S. Office Action dated Sep. 21, 2009 U.S. Appl. No. 10/409,427; 69 pgs.
U.S. Final Office Action dated Mar. 18, 2009 U.S. Appl. No. 10/409,427; 56 pgs.
U.S. Office Action dated Sep. 15, 2008 U.S. Appl. No. 10/409,427; 20 pgs.
Canadian Office Action dated Feb. 3, 2009 from Application No. 2,512,338, 2 pgs.
CN Second Office Action dated Nov. 27, 2009 from Chinese Patent Appl. No. 200480020541.5.
US Office Action dated Oct. 5, 2009, from related U.S. Appl. No. 10/346,050 [Palermo].
US Office Action dated Jan. 27, 2010, from related U.S. Appl. No. 10/346,050 [Palermo].
US Notice of Allowance dated Apr. 19, 2010 from related U.S. Appl. No. 10/409,427.
US Allowed Claims (Apr. 19, 2010) from related U.S. Appl. No. 10/409,427.
EP Examiner's Communication pursuant to Article 96(2) EPC dated Jul. 26, 2007 from European Application No. 03815236.9, 4 pgs.
Second Chinese Office Action dated Aug. 24, 2007 from Chinese Patent Application No. 200380108620.7 filed Dec. 18, 2003 15 pgs.
U.S. Office Action dated Oct. 4, 2007 from U.S. Appl. No. 10/655,452, 14 pgs.
EP Examiner's Communication pursuant to Article 96(2) EPC dated Nov. 9, 2007 from European Application No. 04781826.5, 5 pgs.
First Office Action datd Feb. 9, 2007 from Chinese Patent Application No. 200380108620.7 filed Dec. 18, 2003, 7 pgs.
U.S. Office Action dated May 15, 2007 from U.S. Appl. No. 10/655,452, 14 pgs.
International Search Report dated Feb. 7, 2005, from International Application No. PCT/US2004/027217, including Notification of Transmittal.
Written Opinion of the International Searching Authority dated Feb. 7, 2005 from related International Application No. PCT/US2004/027217.
U.S. Office Action dated Nov. 14, 2007 U.S. Appl. No. 10/409,427.
U.S. Final Office Action dated Apr. 30, 2008 U.S. Appl. No. 10/409,427.
U.S. Office Action dated Apr. 17, 2008 U.S. Appl. No. 10/346,050 (Palermo).
U.S. Office Action dated Nov. 27, 2007 U.S. Appl. No. 10/346,050 (Palermo).
U.S. Office Action dated Feb. 8, 2007 U.S. Appl. No. 10/346,050 (Palermo).
http://en.wikipedia.org/wiki/IP_protocol.
http://en.wikipedia.org/wiki/Network_layer.
http://en.wikipedia.org/wiki/Generic_Routine_Encapsulation.
http://en.wikipedia.org/wiki/MPLS.
http://en.wikipedia.org/wiki/IPv4#Fragmentation.
U.S. Office Action dated Mar. 5, 2008 from U.S. Appl. No. 10/655,452, 14 pgs.
Office Action dated Sep. 3, 2008 for U.S. Appl. No. 10/346,050. (Palermo).

First Office Action dated May 23, 2008 from Chinese Patent Application No. 200480020541.5 7 pgs.
Office Action dated Jul. 18, 2008 for AU Patent Application No. 2003301218.
Office Action dated Sep. 15, 2008 from U.S. Appl. No. 10/409,427.
Notice of Allowance and Allowability dated Sep. 19, 2008 from U.S. Appl. No. 10/655,452.
Allowed Claims for U.S. Appl. No. 10/655,452.
US Final Office Action dated May 17, 2010 from related U.S. Appl. No. 10/346,050 [Palermo].
US Notice of Allowance dated Sep. 7, 2010 from related U.S. Appl. No. 10/346,050 [Palermo].
US Non-Final Office Action dated Nov. 1, 2010, from U.S. Appl. No. 12/324,703.
US Non-Final Office Action dated Apr. 4, 2011, from U.S. Appl. No. 12/324,703.
US Non-Final Office Action dated Sep. 1, 2011, from U.S. Appl. No. 12/324,703.

* cited by examiner

VIRTUAL PORT BASED SPAN

RELATED APPLICATIONS

This application is a continuation in part of patent application Ser. No. 10/655,452 filed Sep. 3, 2003 now U.S. Pat. No. 7,474,666, "Switch Port Analyzers," by Kloth et al, which is incorporated herein for all purposes.

BACKGROUND OF THE INVENTION

The present invention relates to network technology. More specifically, this invention relates generally to network management and specifically relates to troubleshooting network devices that use the Fibre Channel ("FC") protocol in a network implementing virtualization.

The Switched Port Analyzer (SPAN) feature, sometimes called port mirroring or port monitoring, selects network traffic for analysis by a network analyzer such as a Switch-Probe device or other Remote Monitoring (RMON) probe. The network analyzer is typically attached to a port that is configured to receive a copy of every frame that is sent by a particular host or hosts. This port is called a destination SPAN port. The traffic that is monitored may be ingress traffic (i.e., traffic entering the port) and/or egress traffic (i.e., traffic leaving the port). The port for which ingress and/or egress traffic is monitored is referred to as a source SPAN port. One system for performing SPAN in association with a physical source SPAN port is disclosed in patent application Ser. No. 10/655,452, entitled, "Switch Port Analyzers," by Kloth et al, which was incorporated by reference above.

FIG. 1 is a simplified diagram illustrating an application of SPAN for use with a physical source SPAN port. In the following description, a physical source SPAN port will be referred to as a source SPAN port having a physical address. In order to initiate a SPAN session, the user-configures the SPAN session 102 via a supervisor 104. Specifically, the SPAN session is configured by identifying the source SPAN port and destination SPAN port, as well as indicating whether the traffic to be monitored is ingress and/or egress traffic. The source SPAN port is typically defined by identifying both the line card and port of the line card. The destination SPAN port is also typically defined by identifying both the line card and port of the line card. For instance, a Fibre Channel port 1 of a line card 2 may be denoted as fc2/1.

In this example, there are two different line cards, referred to as Intelligent Line Cards (ILCs), first line card (ILC1) 106 and second line card (ILC2) 108 having corresponding forwarding engines 110 and 112, respectively. Each network device (e.g., host or disk) is coupled to a different physical port. Specifically, with respect to the first line card 106, host 114 is associated with port fc1/1 116, the SPAN destination (SD) port 118 is associated with port fc1/5 120, and disk1 122 is associated with port fc1/7 124. With respect to the second line card 108, disk2 126 is associated with port fc2/1 128.

As one example of the application of SPAN in association with a physical source SPAN port, a user may choose to SPAN all traffic entering port fc1/1 116 and send a replica of this traffic to a SD port that is configured. In this example, the SD port 118 is configured to be port fc1/5 120. Thus, the forwarding engine 110 of the first line card (ILC1) 106 forwards frames entering port fc1/1 116 to the destination address identified in the headers of those frames, per the normal Fibre Channel forwarding protocol. In addition, the forwarding engine 110 replicates the frames so that a replica of this traffic is also forwarded to the SD port, port fc1/5 120, so that the traffic may be analyzed. Of course, the user may similarly choose to configure or select a different SD port for this particular SPAN session.

While it is helpful to perform SPAN for a physical source SPAN port, virtualization is often desirable for a variety of reasons. For instance, it may be desirable to establish virtualization of storage within a network to enable one or more physical storage locations to be logically represented by a virtual storage location. Virtualization of storage within a network such as a Storage Area Network (SAN) may be accomplished via a variety of mechanisms. One such mechanism is set forth in patent application Ser. No. 10/056,238, entitled "Methods and Apparatus for Implementing Virtualization of Storage within a Storage Area Network," by Edsall et al, which is incorporated herein by reference for all purposes. In this manner, a physical address may be mapped to a virtual address for use in accessing a virtual storage location in a SAN.

It is also possible to configure a "virtual port." This may be accomplished via switch-based virtualization (i.e., virtualization implemented in the switches, rather than in the hosts or storage devices). One mechanism for implementing virtual ports via a mechanism such as switch-based virtualization is further described in patent application Ser. No. 10/045,883, entitled "Methods and Apparatus for Implementing Virtualization of Storage within a Storage Area Network Through a Virtual Enclosure," Kumar et al, which is incorporated herein by reference for all purposes. Specifically, a virtual enclosure representing one or more virtual storage units may be created, where each of the virtual storage units represents one or more physical storage locations of one or more physical storage units of a SAN. This virtual enclosure may have one or more associated virtual enclosure ports (i.e., virtual ports). Each virtual port is typically associated with a physical port of a network device within the SAN. The physical port of the network device is then instructed to handle messages addressed to the virtual port. Since each port may manage virtualization of its own traffic, virtualization capacity may scale with the number of ports on a switch.

While it is possible to configure a SPAN session for a physical source SPAN port, there is currently no mechanism to monitor traffic to or from a particular virtual port. In fact, in order to capture all the traffic related to a particular virtual interface, one would have to monitor all the physical links that carry traffic for the virtual interface. The irrelevant traffic would then need to be filtered out. This would therefore require a huge amount of fabric bandwidth and resources, even though one is only interested in traffic on a specific virtual interface. As a result, this approach is extremely inefficient.

Moreover, it is not practical to determine the physical links on which the traffic for a virtual port is flowing. Specifically, in order to identify these physical links, the routing information would need to be obtained and analyzed. However, since the routing information changes dynamically, identifying these physical links would be a difficult and computationally expensive process.

Even if it were possible to identify and monitor the physical links on which the traffic for a virtual port is flowing, a large amount of traffic for a virtual port may not travel outside the switch. As a result, such traffic would not cross a physical link. Unfortunately, the SPAN feature is not capable of capturing such internal traffic.

Moreover, a key advantage of network-based (i.e., switch-based) virtualization is that the hosts or the disks can be moved anywhere in the network, since the virtual port continues to retain the same identifier. However, according to the SPAN implementation set forth above, the SPAN configuration would need to be modified to reflect the new physical location of the hosts/disks. As a result, the SPAN configuration would need to be immediately modified for every relocation of a physical node. Otherwise there would be a window of time during which traffic would not be SPANed.

In view of the above, it would be beneficial if traffic associated with a virtual port could be effectively monitored via a SPAN feature.

SUMMARY OF THE INVENTION

Methods and apparatus for performing SPAN for virtual ports are disclosed. This is accomplished, in part, by supporting SPAN for virtual ports. In this manner, traffic associated with a virtual port may be analyzed.

In accordance with one aspect of the invention, a frame is received from a first port. The frame or a copy thereof is transmitted to a second port, where the second port is identified in a header of the frame. At least one of the first port and the second port is a virtual port. The frame or a copy thereof is also transmitted to a third port, thereby enabling an analyzer coupled to the third port to analyze traffic received by the third port. Embodiments of the invention may be implemented in a Fibre Channel network, as well as other types of networks.

In accordance with another aspect of the invention, the third port is configured as a SPAN destination port, while the first or second port is configured as a SPAN source port. The configuration information is used to determine whether frames transmitted from the first port to the second port are to be analyzed. In particular, the SPAN source port for which traffic is to be analyzed may be an ingress and/or egress port. Thus, it is possible that either the first or the second port may be configured as a SPAN source port.

In accordance with one embodiment, a virtual SPAN source port is identified by a line card, a virtualization engine on the line card, and a virtual port. For instance, the virtualization engine may include software and/or hardware such as that of a hardware ASIC of a CPU that performs virtualization operations. The virtualization engine is responsible for performing SPAN (e.g., duplicating the frame associated with the virtual SPAN source port for analysis by an analyzer coupled to the SPAN destination port). In addition, the virtualization engine is also responsible for performing virtual-physical address mapping and translation in order to route the frames to their intended destination. For instance, the virtualization engine may manage address translation to enable SCSI requests to be transmitted to the appropriate physical disks in a sequence consistent with the virtualization model that is implemented.

In accordance with yet another aspect of the invention, when a user configures a SPAN session, a first set of configuration information identifying a virtual source SPAN port for which traffic is to be analyzed is received, where the virtual port is an ingress and/or egress port. In addition, a destination SPAN port that is to receive a copy of the traffic to be analyzed is identified. For instance, the destination SPAN port may be selected by the user or may be pre-configured. Thus, the first set of configuration information may identify the virtual source SPAN port, the destination SPAN port, and indicate whether the virtual source SPAN port is an ingress and/or egress port for purposes of traffic forwarding and analysis. A second set of configuration information associated with the first set of configuration information is then transmitted to a line card associated with the virtual source SPAN port, thereby enabling the line card to transmit a copy of frames for which traffic is to be analyzed for the virtual source SPAN port to the destination SPAN port. The second set of information should also identify the virtual source SPAN port, the destination SPAN port, and indicate whether the virtual source SPAN port is an ingress and/or egress port for purposes of traffic forwarding and analysis.

In accordance with one embodiment, the line card and virtualization engine are identified by the user in the first set of configuration information. As one example, a virtual source SPAN port may be identified by an interface name, which identifies the line card, the virtualization engine, and the port.

In accordance with another embodiment, the second set of configuration information is transmitted to the virtualization engine of the line card. Since the line card is responsible for performing SPAN, performing virtual-physical address mapping, and frame forwarding, the virtualization engine needs to be able to identify the virtual source SPAN port. For instance, in order to route frames in a Fibre Channel network, a Fibre Channel Address, referred to as an FCID, is used. In addition, when implemented in a network implementing virtualization, such as a VSAN, the correct VSAN should be identified. Thus, in a Fibre Channel network, the second set of configuration information may identify the virtual source SPAN port via both the FCID and the VSAN that together uniquely identify the virtual source SPAN port, rather than the interface name used to configure the SPAN session.

In accordance with another embodiment, a supervisor is responsible for ensuring that a line card is configured for a particular SPAN session. Specifically, the supervisor receives the first set of configuration information and transmits the appropriate second set of configuration information to the line card. In addition, the supervisor is also responsible for removing a SPAN session configuration from a particular line card, as appropriate. This may be desirable, for example, if a virtual port has been deleted or a SPAN session has been discontinued.

These and other features and advantages of the present invention will be presented in more detail in the following specification of the invention and the accompanying figures, which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Embodiments of the invention support SPAN in a network such as a Fibre Channel network to enable traffic associated with a virtual source SPAN port to be analyzed. In the following description, the embodiments will be described with reference to a Fibre Channel network. However, the disclosed embodiments may also be applied in other types of networks that support virtualization and in which traffic is to be analyzed, such as Ethernet, TCP/IP, ISCSI, FCIP.

There are numerous advantages to performing SPAN for a virtual port. For instance, some frames may not traverse a physical interface. This may occur, for example, if a frame is consumed entirely within the line card. As another example, a frame may be generated entirely within the line card. Since these frames may not traverse a physical interface, the frames cannot be analyzed by performing SPAN for a physical interface. For these reasons, it may be desirable to perform SPAN for a virtual source SPAN port rather than a physical source SPAN port.

In accordance with various embodiments, a virtual port may be a Fibre Channel Node port (N-port) of a virtual enclosure representing one or more virtual storage units, where each of the virtual storage units represents one or more physical storage locations of one or more physical storage units of a SAN. Thus, each virtual port is associated with a physical port of a network device within the SAN. The physical port of the network device is instructed to handle messages addressed to the virtual port. Of course, there are instances where traffic for a virtual port may not exist on a physical port, such as where traffic is generated and processed internally.

The virtual N-port (NV port) may connect to a virtual Fabric port (FV port). In addition, traffic for a NV port can flow through one or more physical ports, since there could be frames from or to different physical ports for that particular virtual port. Conversely, a physical port may carry traffic corresponding to many NV ports.

Figure 1:
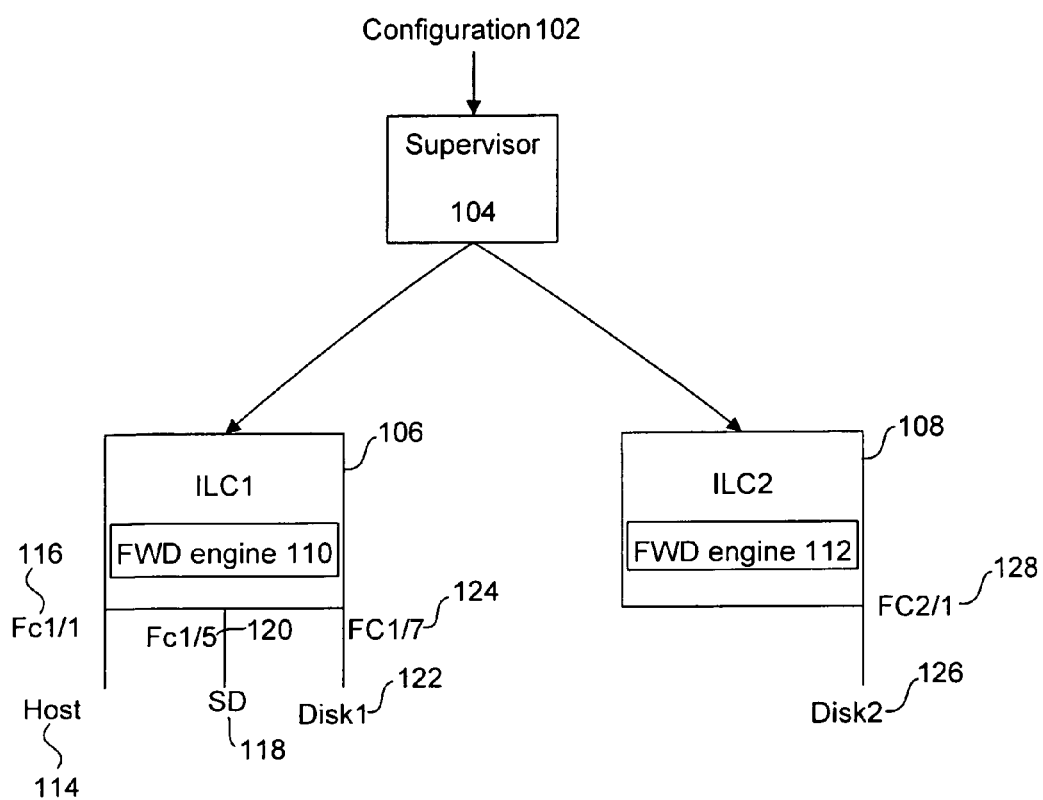
FIG. 1 is a simplified diagram illustrating an application of SPAN for use with a physical source SPAN port.
Figures 2, 3:
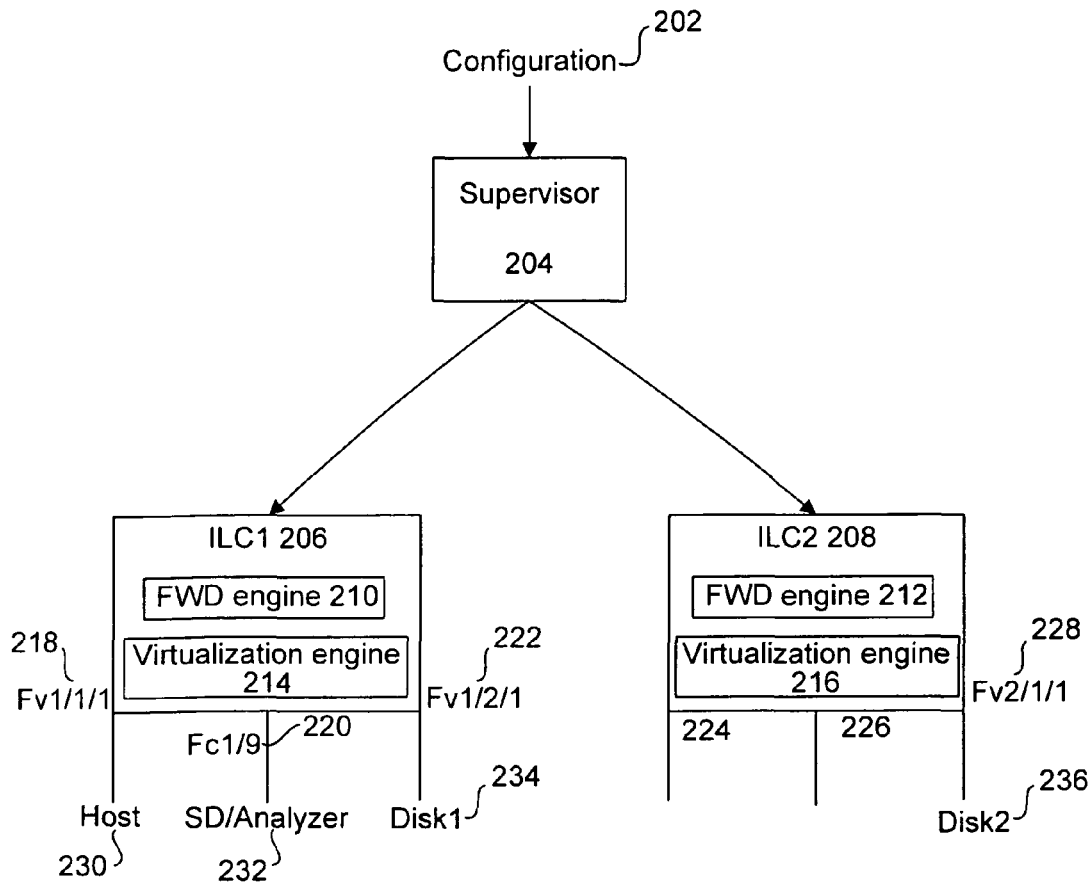
FIG. 2 is a simplified block diagram illustrating a system configured for implementing SPAN for a virtual source SPAN port in accordance with one embodiment of the invention.
FIG. 3 is an exemplary representation of a SPAN session that may be configured.

FIG. 2 is a simplified block diagram illustrating a system configured for implementing SPAN for a virtual source SPAN port in accordance with one embodiment of the invention. In order to configure a SPAN session, a user may submit configuration information at 202. A supervisor 204 obtains the configuration information from the user. For instance, the configuration information may identify the virtual source SPAN port, as well as indicate whether the source SPAN port is an ingress and/or egress port. The configuration information may also identify the SD port, where the SD port is configured by the user rather than pre-configured. The supervisor 204 may then store the configuration information for subsequent SPAN sessions. In addition, the supervisor 204 transmits the configuration information to the appropriate line card(s) so that the line card(s) may be programmed.

In this example, there are two line cards, referred to as Intelligent Line Cards (ILCs), first line card (ILC1) 206 and second line card (ILC2) 208, having corresponding forwarding engines 210 and 212, respectively, which may be capable of forwarding traffic associated with a physical port, as well as performing SPAN associated with a physical port.

In addition, in order to support SPAN in a system supporting virtualization, virtual-physical address mapping functionality is provided to support mapping from virtual to physical addresses, and vice versa. In accordance with one embodiment, this mapping functionality is implemented in a virtualization engine. Thus, each line card has at least one virtualization engine associated therewith. In this example, the line cards 206, 208 each include at least one virtualization engine 214, 216, respectively. In particular, a virtualization engine is capable of handling a maximum number of ports. As a result, each line card may include a plurality of virtualization engines to maximize the traffic throughput for that line card.

In accordance with one embodiment, since virtual-physical address mapping is performed by the virtualization engine(s) 214, 216 for a virtual source SPAN port, the virtualization engine(s) 214, 216 are also responsible for performing forwarding and SPAN associated with the virtual source SPAN port. In other words, the appropriate one of the virtualization engine(s) 214, 216 replicates frames associated with the virtual source SPAN port and forwards them to the appropriate SD port after the appropriate address mapping is performed, in addition to forwarding the original frames to their intended destination. Each virtualization engine may be implemented in hardware, software, or a combination thereof.

The first line card ILC1 206 has a set of interfaces 218, 220, 222 and the second line card ILC2 208 has a set of interfaces 224, 226, 228. Each of the interfaces may be coupled to a network device such as a host or memory (e.g., disk). In addition, any of the interfaces may be configured as the SPAN destination (SD) port. In this example, a host 230 is coupled to the interface 218, the interface 220 is configured as the SD port 232, and disks Disk1 234 and Disk2 236 are coupled to the interfaces 222 and 228, respectively. An analyzer may be coupled to the SD port at 232, as shown, for analyzing frames received by the SD port.

In accordance with one embodiment, each virtual interface has an associated interface name, while each physical interface has an associated FCID. In particular, a physical interface has an interface name that identifies both the line card and the port. For instance, the interface name for a physical port may be represented by "line card/port." For instance, as shown in FIG. 2, interface 220 has an interface name "fc1/9," which denotes port 9 of line card 1.

A virtual port may similarly be identified by the line card and port. In accordance with one embodiment, a virtual port is further identified by a virtualization engine of the line card that is to process traffic associated with the virtual port. Since the traffic for virtual ports is divided among a plurality of virtualization engines, the traffic for virtual ports may be more efficiently processed. Thus, in order to identify a virtual port, the virtual port may have an interface name which may be represented by "line card/virtualization engine/port." For instance, as shown in FIG. 2, the interface 218 has associated interface name "fv1/1/1," which denotes port 1 of the first virtualization engine of line card 1. As another example, the interface 222 has associated interface name "fv1/2/1," which denotes port 1 of the second virtualization engine of line card 1. Similarly, the interface 228 has associated interface name "fv2/1/1," which denotes port 1 of the first virtualization engine 1 of line card 2.

As set forth above, in order to initiate a SPAN session, a user may configure the SPAN session by submitting a set of configuration information. Specifically, a user may configure a SPAN session via a graphical user interface such as that illustrated in FIG. 3. In this example, the user configures a SPAN session by entering or otherwise selecting a set of configuration information, which indicates the virtual source SPAN port, destination SPAN port, and direction of traffic to be SPANed (e.g., IN/OUT/BOTH). Thus, the user configures a source SPAN port for which traffic is to be duplicated and transmitted to a SD port for analysis. In this example, the source SPAN port is a virtual port that is identified by interface name "fv2/1/1," shown as interface 228 in FIG. 2. Thus, traffic for port 1 of the first virtualization engine of line card 2 is to be analyzed. In addition, the user configures a destination SPAN port to receive a copy of the traffic to be analyzed. In this example, the SD port is configured to be "fc1/9," representing physical port 9 of line card 1, shown as interface 220 in FIG. 2. The user may then indicate whether the virtual port identified as the source SPAN port is an ingress and/or egress port. In other words, the user may indicate whether the traffic flowing the virtual source SPAN port and therefore the traffic to be analyzed is flowing into the virtual port and/or out of the virtual port. In this example, the user indicates that the port is the SPAN source in both the ingress and egress direction for purposes of traffic analysis. In accordance with one embodiment, the SPAN session configuration is stored in persistent memory. In other words, when a SPAN session is configured, it will be retained across reboots.

Once the SPAN session is configured, the appropriate information is transmitted to the first line card, enabling the line card to transmit a copy of frames for which traffic is to be analyzed for the virtual source SPAN port to the destination SPAN port. Specifically, a set of configuration information identifying the virtual source SPAN port, the SD port, and indicating whether the virtual source SPAN port is an ingress and/or egress port is provided to the first line card. The line card then ensures that copies of the frames flowing through the virtual source SPAN port are transmitted to the SD port, as configured for that particular SPAN session. In accordance with one embodiment, the SD port is configured to disregard the buffer-to-buffer credit flow control mechanism of the Fibre Channel protocol.

In this example, when a frame flows into or out of the virtual source SPAN port at interface 228 of FIG. 2, virtual-physical address mapping is performed. The frame is transmitted to its intended destination, while a copy of the frame is forwarded to the SD port at interface 220. An analyzer coupled to the SD port at 232 may then analyze the traffic received by it.

Figure 4:
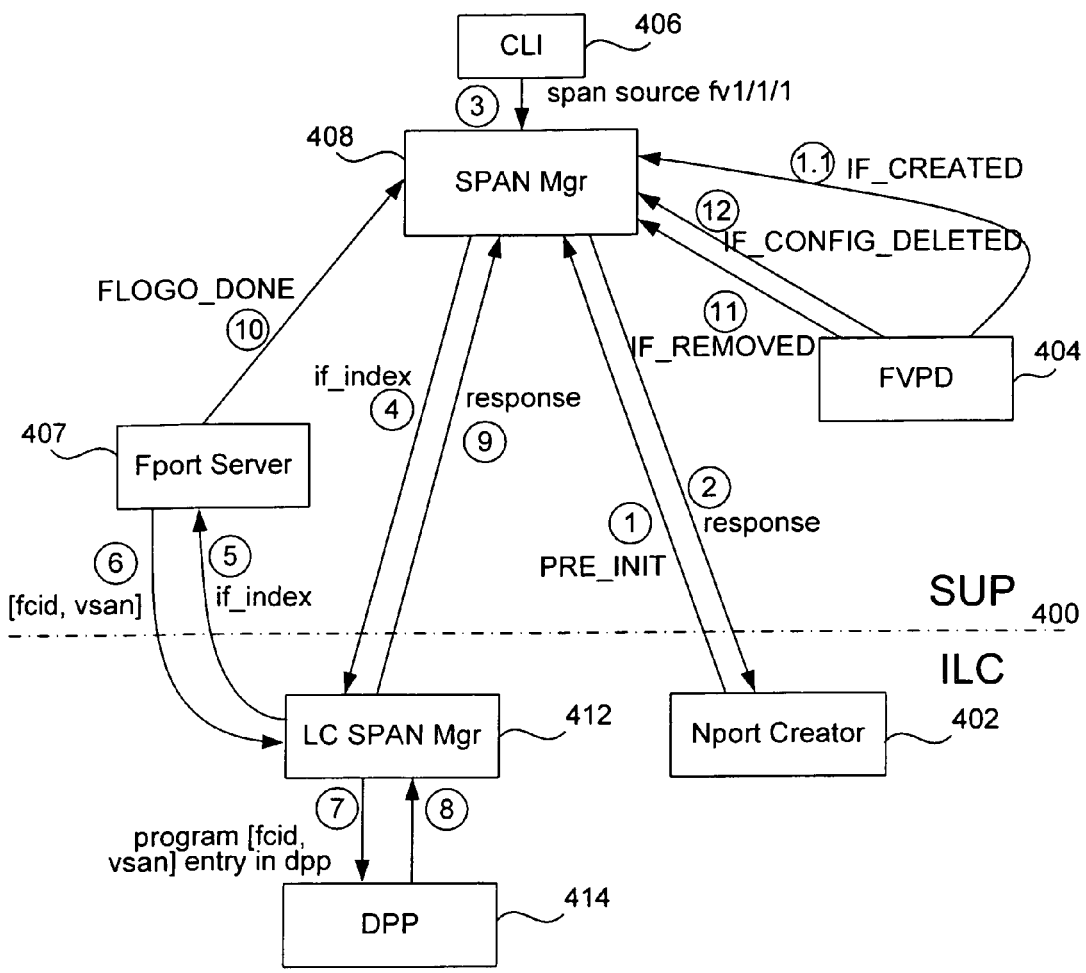
FIG. 4 is a general block diagram illustrating a system in which the present invention may be implemented in accordance with one embodiment of the invention.

SPAN may be implemented for a virtual port through a variety of system configurations. FIG. 4 is a general block diagram illustrating a system in which the present invention may be implemented in accordance with one embodiment of the invention. As shown in FIG. 4, supervisory functions performed outside the line card are represented by boxes above dotted line 400, while functions performed inside the line card are represented by boxes below the dotted line 400. In accordance with one embodiment, supervisory functions are performed by a supervisor, which may be implemented in hardware and/or software.

In accordance with one embodiment, virtual ports are created at the line card. In this example, a Node port (Nport) Creator 402 is responsible for creating virtual ports (e.g., N-ports). More particularly, the Nport Creator 402 obtains configuration information associated with one or more Virtual Storage Area Networks (VSANs). For instance, the VSAN configuration information may indicate that a particular VSAN requires a particular number of virtual interfaces. For each interface that is "requested," the Nport Creator may create a virtual port that is associated with that VSAN. Specifically, each virtual port is assigned a port Worldwide Name (WWN). In addition, in accordance with one embodiment, each virtual port is associated with a virtualization engine of the line card.

Once a virtualization engine has been associated with the virtual port, an interface name, which may be represented by "line card/virtualization engine/port," may also be associated with the virtual port. In accordance with one embodiment, the FV port daemon 404 is responsible for creating this interface name. When the interface name is provided to the Nport Creator 402, the Nport Creator 402 links the interface name to the WWN assigned by the Nport Creator to the virtual port. Each time the line card is rebooted, a new FCID is allocated to the virtual port by Fport server 407. The FCID allocated by the Fport server 407 is then associated with the VSAN identifier and interface name of the virtual port.

It is important to note that the FCID associated with a virtual port does not remain constant. Therefore, in order to route a particular frame in association with a virtual source SPAN port and perform SPAN for that frame, the FCID associated with the virtual source SPAN port must be obtained. In accordance with one embodiment, when a user configures a SPAN session for a virtual source SPAN port via a graphical user interface at 406, this configuration information is provided to a SPAN Manager 408, which then forwards the appropriate configuration information to LC SPAN manager 412 of the line card. For instance, the interface name may be provided to the LC SPAN manager 412 so that the corresponding FCID may be obtained. The LC SPAN Manager 412 then obtains the FCID and VSAN identifier for the virtual source SPAN port so that the corresponding frame can be processed. This may be accomplished by identifying the VSAN and FCID associated with the interface name of the virtual source SPAN port. In accordance with one embodiment, the LC SPAN Manager 412 sends the interface name corresponding to the virtual source SPAN port to Fport server 407. The Fport server 407 then looks up the interface name to identify the corresponding VSAN and FCID that together uniquely identify the virtual port, which it then provides to the LC SPAN Manager 412. The LC SPAN manager 412 then provides the VSAN identifier and FCID, along with other pertinent SPAN configuration information, such as SD port and an indicator as to whether the source SPAN port is an ingress and/or egress port, to the Virtualization Engine 414 of the line card. The Virtualization Engine 414 may then store the information for the SPAN session to enable traffic to be processed accordingly.

Once the Virtualization Engine 414 has received the VSAN identifier and FCID that uniquely identifies the virtual source SPAN port, it can process traffic for the virtual port. More particularly, the Virtualization Engine 414 duplicates frames associated with the virtual source SPAN port and transmits those frames to the SD port. For instance, the Virtualization Engine 414 may obtain the FCID and VSAN identifier from the header of the frame to look up the FCID and VSAN in the SPAN session information such that the SD port and other information for the SPAN session can be determined. In addition, the Virtualization Engine 414 also performs the appropriate virtual-physical address mapping in order to forward frames to the intended destination. For instance, the virtualization engine may manage address translation to enable SCSI requests to be transmitted to the appropriate physical disks in a sequence consistent with the virtualization model that is implemented.

Figure 5:
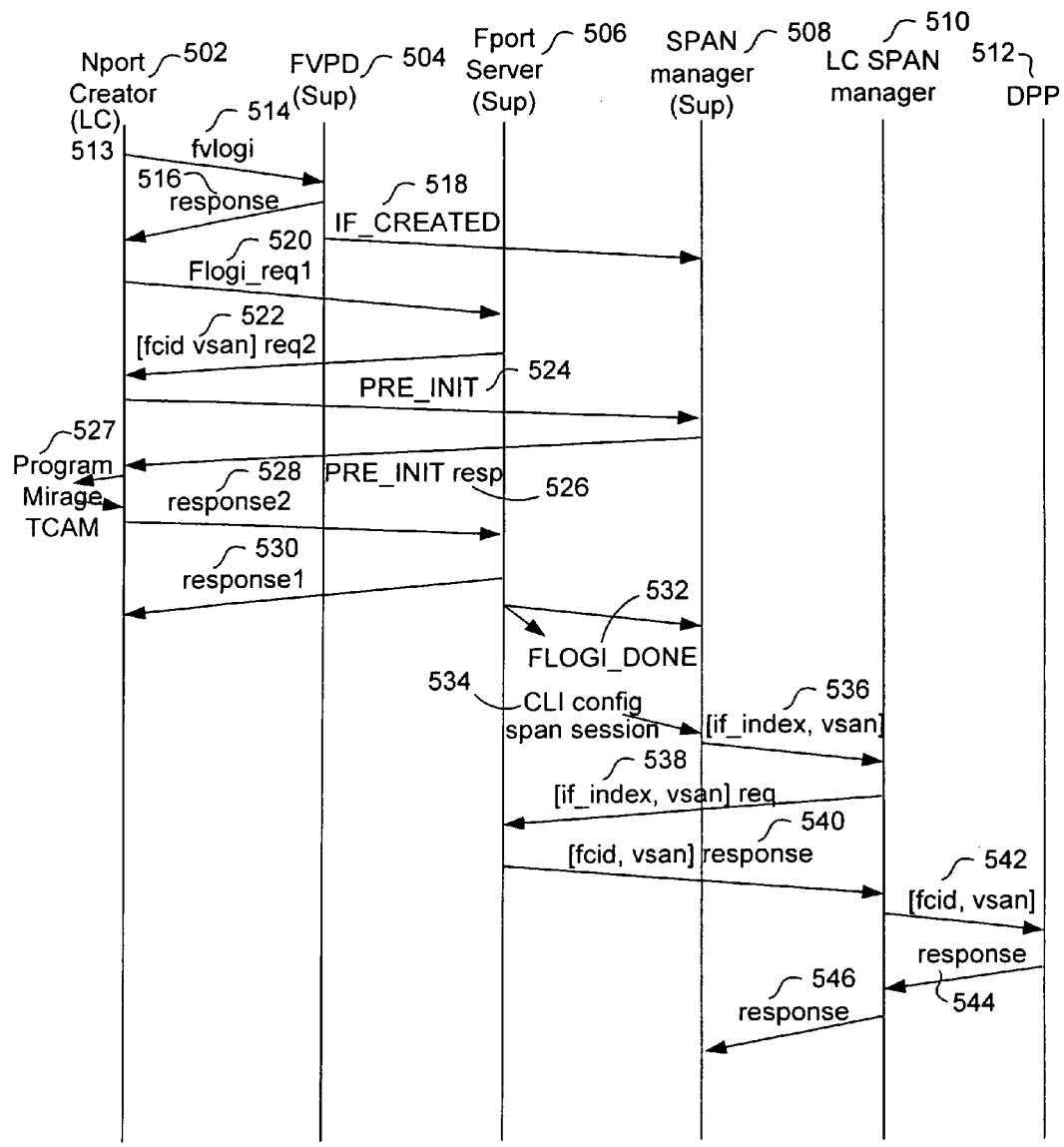
FIG. 5 is a transaction flow diagram illustrating a method of creating a virtual port and configuring SPAN information associated with the virtual port.

FIG. 5 is a transaction flow diagram illustrating a method of creating a virtual port (e.g., to enable a SPAN session associated with the virtual port to be configured or to activate an existing SPAN session that involves a virtual port) and configuring a SPAN session associated with the virtual port in a system such as that described above with reference to FIG. 4. As shown, interactions between Nport Creator 502, Port Daemon (PD) 504, Fport Server 506, SPAN manager 508, LC SPAN manager 510, and virtualization engine 512 are represented by corresponding labeled vertical lines.

Two different scenarios are illustrated in FIG. 5. First, the steps performed to create a virtual port (e.g., to enable a SPAN session associated with the virtual port to be created or to activate an existing SPAN session that involves a virtual port) are illustrated in steps 514 through 530. Second, the steps performed to create a SPAN session for an existing virtual port are illustrated in steps 532 through 546.

In order to initially create a SPAN session for a virtual port or activate an existing SPAN session for a virtual port, the virtual port must be created. As described above, in accordance with one embodiment, the Nport Creator 502 of the line card creates one or more virtual ports as needed for each existing SPAN session. Each virtual port has an associated WWN.

When the line card is rebooted or when it first comes up, the Nport Creator identifies which VSANs need virtual interfaces. For instance, the Nport Creator may obtain VSAN configuration information to identify the number of virtual interfaces associated with each VSAN. The Nport Creator may then create one or more virtual ports, as necessary. For each virtual port that is created, the virtual port is assigned a WWN by the Nport Creator and associated with a particular VSAN at 513.

Once the Nport Creator creates a virtual port, the Nport Creator may log in the virtual port. Specifically, the Nport Creator performs a fabric login (FLOGI) for the virtual port (e.g., by specifying the WWN for the virtual port) at 514. In accordance with one embodiment, the FVPD creates an interface name and provides the interface name for the WWN to the Nport Creator at 516. The Nport Creator then associates the interface name with the virtual port, and therefore with the WWN and VSAN. The FVPD may then notify the SPAN manager that the interface name has been created at 518. For instance, the processing performed by various system components may be initiated upon notification that the interface name has been created.

In order for a Fibre Channel node to establish a logical connection to a fabric switch, it performs a fabric login (FLOGI). Unlike many LAN technologies that use a fixed Media Access Control (MAC) address, Fibre Channel uses an address identifier, referred to as an FCID, which is dynamically assigned during login. Thus, in accordance with one embodiment, the Nport Creator 502 requests an FCID for a virtual port on a particular VSAN. Specifically, the Nport Creator 502 provides the VSAN identifier at 520 to the Fport Server by performing an FLOGI (e.g., by specifying the port WWN). The Fport Server then assigns an FCID to the virtual port and provides the FCID and VSAN identifier to the Nport Creator at 522. Through the use of both the FCID and VSAN, the virtual port may be identified.

In addition, the Fport Server may notify the Nport Creator that the virtualization engine needs to be programmed. Thus, in accordance with one embodiment, the Nport Creator then sends a PRE_INIT message at 524 to the SPAN manager indicating that the virtual port has logged in and that the virtualization engine now needs to be programmed. The PRE_INIT message may include the interface name, FCID and the VSAN identifier that is associated with that virtual port. The SPAN manager may then store the VSAN identifier and interface name in a table or other suitable data structure for tracking virtual ports. The SPAN manager may then sends a PRE_INIT response message at 526 to the Nport Creator acknowledging that it should now program the corresponding virtualization engine. The Nport Creator programs the appropriate virtualization engine at 527. In particular, the virtualization engine is programmed to enable traffic for a virtual port to be processed by the virtualization engine. For instance, the interface name may be associated with the VSAN identifier and FCID. The Nport Creator then notifies the Fport Server that the appropriate virtualization engine has been programmed for the virtual port at 528. The Fport Server then sends a response to the Nport Creator at 530 acknowledging that the virtualization engine has been programmed for the virtual port. The Fport Server may now notify the SPAN manager that frames for the virtual port may now be processed.

In accordance with one embodiment, the Fport Server is responsible for notifying the SPAN manager that the virtual port has logged in and that the virtualization engine has been programmed for the virtual port. This may be desirable, since the SPAN manager may now enable a user to select this particular virtual port during the configuration of a SPAN session. As shown at 532, the Fport Server sends a message to the SPAN manager that indicates that frames associated with the virtual port, identified by the corresponding port WWN or interface name, can now be processed by the corresponding virtualization engine.

When a user configures a SPAN session at 534, the user enters or otherwise selects configuration information for the SPAN session. Specifically, the configuration information indicates a SPAN source port (e.g., interface name), a SPAN destination port, and an indication of whether the traffic being spanned is ingress and/or egress traffic. For instance, the user may indicate whether the traffic to be analyzed is IN and/or OUT.

Once the user has configured the SPAN session, the SPAN manager may look up the VSAN identifier for the interface name that has been configured. The SPAN manager may then send the interface name and optionally the VSAN identifier to the LC SPAN manager at 536. The LC SPAN manager queries the Fport server for the FCID (and the VSAN identifier if not previously provided to it by the SPAN manager) corresponding to the interface name at 538. The Fport server then provides the FCID and VSAN to the LC SPAN manager at 540. The FCID, VSAN, and associated configuration information (e.g., Destination SPAN port and whether traffic to be monitored is ingress and/or egress) are then provided to the virtualization engine at 542.

The virtualization engine 512 may then send a response indicating success or failure of the SPAN session configuration at 544. This response may then be forwarded to the SPAN manager at 546. If the configuration of the virtualization engine has been successful, the virtualization engine proceeds to process traffic for the configured SPAN session. Specifically, the virtualization engine proceeds to perform virtual-physical address mapping for traffic associated with the source SPAN port and forward traffic accordingly, as well as perform SPAN for the configured SPAN session. Frames that are forwarded may be transmitted via hardware, or may be sent directly to their intended destination by passing the hardware.

In accordance with one embodiment, when a frame is received (e.g., by the virtualization engine), it is determined whether SPAN needs to be performed for that frame. In other words, the line card determines whether a corresponding SPAN session has been configured. For instance, the virtualization engine may search for a SPAN entry identifying a source SPAN port from which a frame was received (e.g., for ingress traffic) or to which the frame is to be transmitted (e.g., for egress traffic). For each frame having a corresponding SPAN entry, SPAN is performed.

SPAN is performed continuously as configured until SPAN configuration information is changed in one of two ways. First, it may be desirable to delete a virtual port. For instance, a user may wish to delete or re-configure a virtual port, such as when the functionality or service provided by the virtual port is no longer needed. Second, a user may choose to discontinue a particular SPAN session. In either instance, the SPAN session is deleted.

Figure 6:
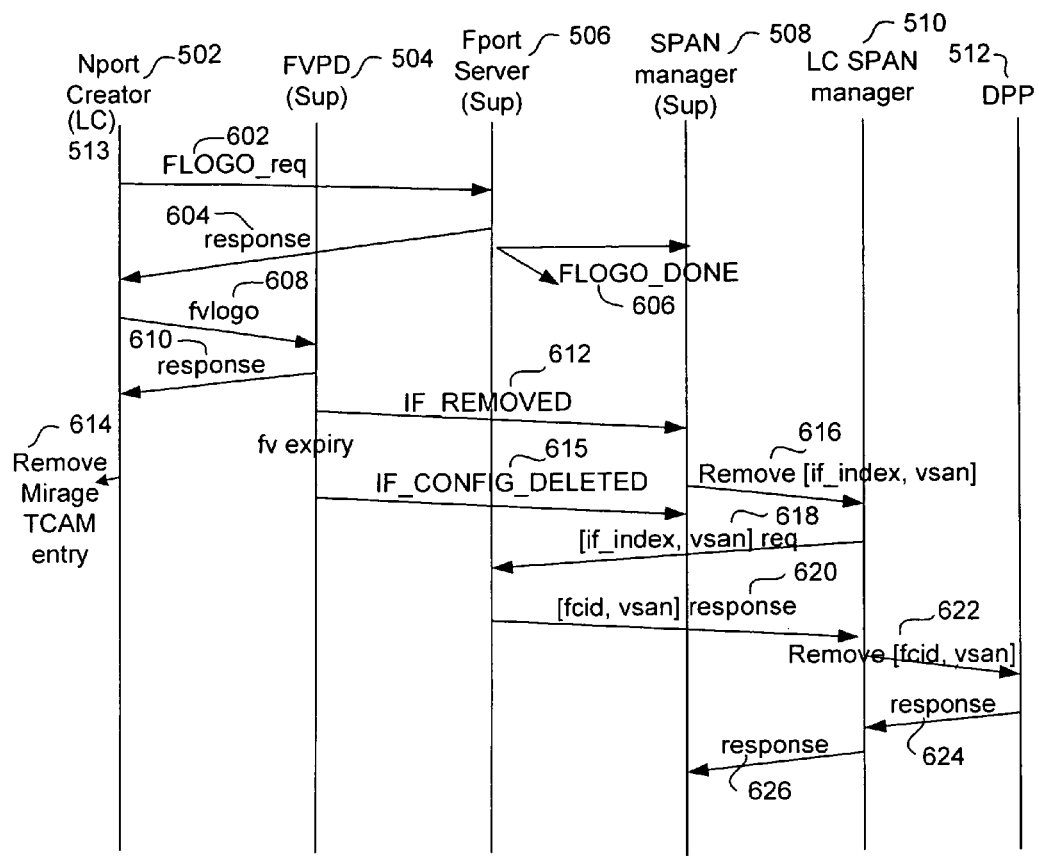
FIG. 6 is a transaction flow diagram illustrating a method of updating the SPAN information associated with a virtual port when the virtual port is deleted or a SPAN session is discontinued.

FIG. 6 is a transaction flow diagram illustrating a method of updating the SPAN information associated with a virtual port when the virtual port is deleted or a SPAN session is discontinued. When a virtual port has been deleted, the line card logs out the virtual port. In accordance with one embodiment, the Nport creator sends a fabric logout (FLOGO) identifying the WWN of the virtual port at 602 to the Fport Server. The Fport Server sends a response confirming the fabric logout of the virtual port at 604 to the Nport Creator.

In accordance with one embodiment, the Fport Server is responsible for notifying the SPAN manager that the virtual port is no longer logged in. This may be desirable, since the SPAN manager may now prevent a user from selecting or entering this particular virtual port during the configuration of a SPAN session. As shown at 606, the Fport Server sends a message to the SPAN manager that indicates that frames associated with the virtual port, identified by the corresponding port WWN or interface name, can no longer be processed by the corresponding virtualization engine.

The Nport Creator also notifies the Port Daemon that the virtual port has been logged out at 608. The Port Daemon acknowledges that the virtual port is no longer logged in at 610. The Port Daemon may then notify the SPAN manager that the virtual port has been removed (or logged out) at 612. In order to remove the virtual port, the virtualization engine is programmed at 614. For instance, the interface name may no longer be recognized as a virtual port in association with the VSAN and FCID.

As set forth above, when a virtual port is removed, it is no longer functional as a SPAN port. Thus, in addition to removing the virtual port, if that virtual port has previously been configured as a source SPAN port, that configuration information needs to be updated. Of course, even if the virtual port has not been removed, a user may choose to discontinue a particular SPAN session. Thus, the configuration of a virtual port as a source SPAN port may be deleted by a user as shown at 615. In either case, the configuration information associated with the virtual port is removed from the appropriate entities.

In order to remove the configuration information associated with a source SPAN port, the SPAN manager identifies the virtual port (e.g., via interface name) from the message received from the Port Daemon at 612 or 615. Upon receiving the interface name, the SPAN manager may look up the corresponding VSAN for the virtual port. The SPAN manager may then send a message to the LC SPAN manager to request that the LC SPAN manager remove the configuration information for the virtual port from the line card at 616 (e.g., by specifying the interface name and optionally the VSAN of the virtual port). The LC SPAN manager may then request the FCID (and VSAN, as appropriate) associated with the virtual port from the Fport Server at 618 (e.g., by specifying the interface name). The Fport Server looks up the interface name to identify the corresponding FCID and VSAN at 620 and provides the FCID and VSAN that together uniquely identify the virtual port to the LC SPAN manager at 620. The LC SPAN manager then instructs the appropriate virtualization engine to remove the SPAN entry corresponding to the FCID and VSAN at 622. In this manner, a SPAN entry identifying the SD SPAN port and indicating whether ingress and/or egress frames associated with the virtual port are to be SPANed is removed. The virtualization engine may then indicate to the LC SPAN manager whether the re-configuration was successful by sending a response to the LC SPAN manager at 624. The LC SPAN manager may then forward this response to the SPAN manager at 626.

The apparatus (e.g. switch or router) of this invention may be specially constructed for the required purposes, or may be a general purpose programmable machine selectively activated or reconfigured by a computer program stored in memory. The processes presented herein are not inherently related to any particular switch or other apparatus.

Generally, the techniques of the present invention may be implemented on software and/or hardware. For example, it can be implemented in an operating system kernel, in a separate user process, in a library package bound into network applications, on a specially constructed machine, or on a network interface card.

A software or software/hardware hybrid route optimization system of this invention is preferably implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the systems of this invention may be specially configured switches such as the MDS series of Fibre Channel switches, including Cisco MDS series 9200 and 9500 available from Cisco Systems, Inc. of San Jose, Calif. A general architecture for some of these machines will appear from the description given below. In an alternative embodiment, the SPAN methods and system may be implemented on a general-purpose network host machine such as a personal computer or workstation, appliance, or storage device. Further, the invention may be at least partially implemented on a card (e.g., an interface card) for a network device or a general-purpose computing device.

Figure 7:
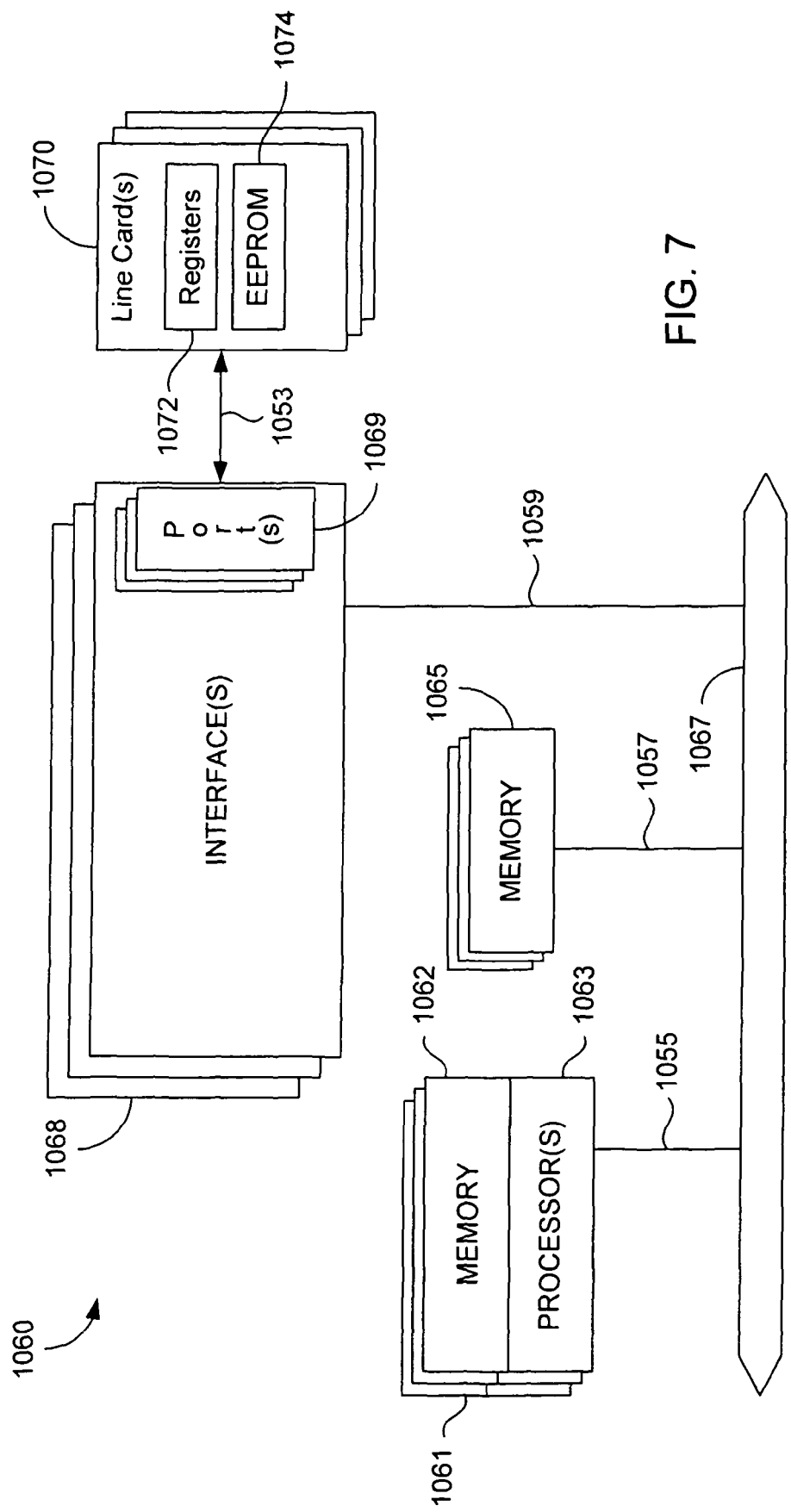
FIG. 7 is a diagrammatic representation of a router in which embodiments of the present invention may be implemented.

Referring now to FIG. 7, a network device 1060 suitable for implementing the techniques of the present invention includes a master central processing unit (CPU) 1062, interfaces 1068, and a bus 1067 (e.g., a PCI bus). When acting under the control of appropriate software or firmware, the CPU 1062 may be responsible for implementing specific functions associated with the functions of a desired network device. For example, when configured as an intermediate router, the CPU 1062 may be responsible for analyzing frames, encapsulating frames (or packets), and forwarding frames for transmission to a set-top box. The CPU 1062 preferably accomplishes all these functions under the control of software including an operating system (e.g. Windows NT), and any appropriate applications software.

CPU 1062 may include one or more processors 1063 such as a processor from the Motorola family of microprocessors or the MIPS family of microprocessors. In an alternative embodiment, processor 1063 is specially designed hardware for controlling the operations of network device 1060. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

The interfaces 1068 are typically provided as interface cards (sometimes referred to as "line cards"). Generally, they control the sending and receiving of data frames over the network and sometimes support other peripherals used with the network device 1060. Among the interfaces that may be provided are Fibre Channel ports, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as frame switching, media control and management. By providing separate processors for the communications intensive tasks, these interfaces allow the master microprocessor 1062 to efficiently perform routing computations, network diagnostics, security functions, etc.

Although the system shown in FIG. 7 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of the network device's configuration, it may employ one or more memories or memory modules (such as, for example, memory block 1065) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

In accordance with various embodiments of the invention, it is possible to monitor (and analyze) traffic associated with a virtual port independent of the location of any associated hosts or disks. Of course, traffic monitoring and analysis may be implemented using a variety of processes or applications. For instance, such applications may obtain information from the frames such as a Logical Unit (LUN), Logical Block Address (LBA) range, data patterns, type of I/O, etc. For instance, the type of I/O may include such as read or write, as well as control commands. In addition, traffic monitoring and analysis may be performed with frames sent in accordance with a variety of protocols, such as Ethernet, iSCSI, FCIP, iFCP, and IPFC. This may desirable, for instance, in order to debug a particular protocol such as an in-house protocol (e.g., interlocking). For instance, a virtual port for IPFC termination may be identified in a SPAN session to debug the IPFC protocol. In this manner, traffic on a particular link specific to an in-house protocol may be captured and analyzed.

In the above description, the term "frame" is used throughout. However, the term "frame" is intended to be used interchangeably with the term "packet." Accordingly, the term "frame" is intended to be interpreted broadly rather than narrowly.

While the invention has been particularly shown and described with reference to specific embodiments thereof, it will be understood by those skilled in the art that changes in the form and details of the disclosed embodiments may be made without departing from the spirit or scope of the invention. For instance, it will be appreciated that at least a portion of the functions described herein could be performed by one or more devices, e.g., by a microprocessor, by a cluster of microprocessors, etc. Considering these and other variations, the scope of the invention should be determined with reference to the appended claims.

What is claimed is:

1. A method, comprising:
   receiving a frame from a first port, wherein the frame is a Fibre Channel frame;
   transmitting the frame or a copy thereof to a second port, the second port being identified in a header of the frame, wherein at least one of the first port or the second port is a virtual port;
   determining whether at least one of traffic received from the first port or traffic addressed to the second port is to be analyzed;
   obtaining a Fibre Channel Identifier (FCID) and Virtual Storage Area Network (VSAN) identifier from the frame; and
   ascertaining a third port associated with the FCID and VSAN identifier, wherein the third port is configured to disregard the buffer-to-buffer credit flow control mechanism of the Fibre Channel protocol;
   transmitting the frame or a copy thereof to the third port, thereby enabling an analyzer coupled to the third port to analyze traffic received by the third port;
   wherein determining whether at least one of traffic received from the first port or traffic addressed to the second port is to be analyzed and transmitting the frame or a copy thereof to the third port is performed by a virtualization engine of a line card; and
   wherein transmitting the frame or a copy thereof to the third port is performed when it is determined that at least one of traffic received from the first port or traffic addressed to the second port is to be analyzed.

2. The method as recited in claim 1, wherein each virtual port is associated with a physical port, wherein the physical port carries traffic at least one of to or from one or more virtual ports.

3. The method as recited in claim 1, wherein traffic associated with the virtual port does not traverse a physical port.

4. The method as recited in claim 1, wherein determining whether at least one of traffic received from the first port or traffic addressed to the second port is to be analyzed and transmitting the frame or a copy thereof to the third port is performed by a virtualization engine of a line card of a network device performing the receiving, transmitting, determining, obtaining, ascertaining, and transmitting steps.

5. The method as recited in claim 1, wherein the virtualization engine is implemented in at least one of hardware or software.

6. The method as recited in claim 1, wherein determining whether at least one of traffic received from the first port or traffic addressed to the second port is to be analyzed is performed by identifying a port to be analyzed;
wherein the port to be analyzed is configured as a source Switched Port Analyzer (SPAN) port, wherein the source SPAN port is associated with a virtualization engine of a line card.

7. The method as recited in claim 1, wherein transmitting the frame or a copy thereof to a second port comprises:
performing mapping between a virtual address and a physical address when at least one of the first port or the second port is a virtual port.

8. The method as recited in claim 1, further comprising:
analyzing the frame or the copy thereof received by the analyzer via the third port.

9. The method as recited in claim 1, wherein the first or second port is associated with a protocol for which traffic is being analyzed.

10. The method as recited in claim 1, wherein the analyzer analyzes traffic by obtaining information from the frame or the copy thereof received via the third port.

11. An apparatus, comprising:
a processor; and
a memory, at least one of the processor or the memory being adapted for:
receiving a frame from a first port, wherein the frame is a Fibre Channel frame;
transmitting the frame or a copy thereof to a second port, the second port being identified in a header of the frame, wherein at least one of the first port or the second port is a virtual port;
identifying a port to be analyzed by determining whether at least one of traffic received from the first port or traffic addressed to the second port is to be analyzed;
obtaining port information including at least one of a Fibre Channel Identifier (FCID) or Virtual Storage Area Network (VSAN) identifier from the frame;
looking up a third port associated with the port information, wherein the third port is configured to disregard the buffer-to-buffer credit flow control mechanism of the Fibre Channel protocol; and
transmitting the frame or a copy thereof to the third port, thereby enabling an analyzer coupled to the third port to analyze traffic received by the third port;
wherein transmitting the frame or a copy thereof to the third port is performed when it is determined that at least one of traffic received from the first port or traffic addressed to the second port is to be analyzed.

12. The apparatus as recited in claim 11, wherein transmitting the frame or a copy thereof to the second port and transmitting the frame or a copy thereof to the third port are performed by a virtualization engine of a line card of the apparatus.

13. The apparatus as recited in claim 11, wherein transmitting the frame or a copy thereof to a second port comprises:
performing mapping between a virtual address and a physical address.

14. The apparatus as recited in claim 11, wherein determining whether at least one of traffic received from the first port or traffic addressed to the second port is to be analyzed and transmitting the frame or a copy thereof to the third port is performed by a virtualization engine of a line card of the apparatus.

15. The apparatus as recited in claim 11, wherein determining whether at least one of traffic received from the first port or traffic addressed to the second port is to be analyzed is performed by identifying a port to be analyzed.

16. The apparatus as recited in claim 15, wherein the port to be analyzed is configured as a source Switched Port Analyzer (SPAN) port.

17. The apparatus as recited in claim 16, wherein the source SPAN port is associated with a virtualization engine of a line card of the apparatus.

18. The apparatus as recited in claim 11, wherein traffic associated with the virtual port does not traverse a physical port.

19. The apparatus as recited in claim 11, at least one of the processor or the memory being further adapted for:
mapping between a physical port and the virtual port.

20. An apparatus, comprising:
means for receiving a frame from a first port, wherein the frame is a Fibre Channel frame;
means for transmitting the frame or a copy thereof to a second port, the second port being identified in a header of the frame, wherein a port for which traffic is to be analyzed is at least one of the first port or the second port, wherein the port for which traffic is to be analyzed is a virtual port;
means for identifying the port for which traffic to be analyzed;
means for obtaining port information including at least one of a Fibre Channel Identifier (FCID) or Virtual Storage Area Network (VSAN) identifier from the frame;
means for identifying a third port associated with the port information, wherein the third port is configured to disregard the buffer-to-buffer credit flow control mechanism of the Fibre Channel protocol; and
means for transmitting the frame or a copy thereof to the third port, thereby enabling an analyzer coupled to the third port to analyze traffic received by the third port;
wherein transmitting the frame or a copy thereof to the third port is performed when it is determined that at least one of traffic received from the first port or traffic addressed to the second port is to be analyzed.

21. The apparatus as recited in claim 20, wherein the means for identifying the port for which to be analyzed comprises:
means for receiving configuration information identifying the virtual port for which traffic is to be analyzed.

22. The apparatus as recited in claim 20, wherein the means for identifying a third port associated with the port information comprises:
means for obtaining at least one of a Fibre Channel Identifier (FCID) associated with the virtual port or a virtual storage area network identifier associated with the virtual port.

23. The apparatus as recited in claim 20, wherein traffic associated with the virtual port does not traverse a physical port.

24. The apparatus as recited in claim 20, further comprising:
means for mapping between a physical port and the virtual port.

* * * * *